(12) United States Patent
Havaux et al.

(10) Patent No.: US 9,587,149 B2
(45) Date of Patent: Mar. 7, 2017

(54) PRESSURE SENSITIVE ADHESIVE COPOLYMER COMPOSITIONS

(75) Inventors: Nathalie Havaux, Ottignies-Louvain-la-Neuve (BE); François Simal, Forest (BE); Olga Kameneva, Ottignies-Louvain-la-Neuve (BE)

(73) Assignee: HEXION INC., Columbus, OH (US)

( * ) Notice: Subject to any disclaimer, the term of this patent is extended or adjusted under 35 U.S.C. 154(b) by 170 days.

(21) Appl. No.: 14/116,871

(22) PCT Filed: May 10, 2012

(86) PCT No.: PCT/EP2012/002070
§ 371 (c)(1),
(2), (4) Date: Nov. 22, 2013

(87) PCT Pub. No.: WO2012/156072
PCT Pub. Date: Nov. 22, 2012

(65) Prior Publication Data
US 2014/0088220 A1    Mar. 27, 2014

(30) Foreign Application Priority Data

May 18, 2011 (EP) .................................. 11004098
Oct. 27, 2011 (EP) .................................. 11008625
Mar. 20, 2012 (EP) .................................. 12001960

(51) Int. Cl.
| | | |
|---|---|---|
| *C09J 133/10* | (2006.01) | |
| *C09J 131/02* | (2006.01) | |
| *C09D 131/02* | (2006.01) | |
| *C09J 131/04* | (2006.01) | |

(52) U.S. Cl.
CPC .......... *C09J 133/10* (2013.01); *C09D 131/02* (2013.01); *C09J 131/02* (2013.01); *C09J 131/04* (2013.01)

(58) Field of Classification Search
CPC ...... C09J 133/10; C09J 131/01; C09J 131/04; C09J 131/08; C09J 131/10; C09D 131/02; C08F 222/26; C08F 220/18; C08F 2220/1808–2220/1891
USPC .......................................................... 523/122
See application file for complete search history.

(56) References Cited

U.S. PATENT DOCUMENTS

| | | | | |
|---|---|---|---|---|
| 4,185,051 | A * | 1/1980 | McKenna, Jr. ........ | C09J 133/08 524/535 |
| 4,822,676 | A * | 4/1989 | Mudge .................. | C08F 220/18 428/343 |
| 4,908,268 | A * | 3/1990 | Mudge .................. | C08F 218/04 428/343 |
| 5,508,107 | A * | 4/1996 | Gutman ................. | C09J 7/0217 428/339 |
| 5,717,015 | A * | 2/1998 | Dust ...................... | C09J 131/04 524/236 |
| 6,964,999 | B1 | 11/2005 | Nakagawa et al. | |

FOREIGN PATENT DOCUMENTS

| | | |
|---|---|---|
| EP | 0282710 A1 | 9/1988 |
| EP | 0332860 A2 | 9/1989 |
| EP | 0530013 A1 | 3/1993 |
| EP | 1634897 A2 | 3/2006 |

\* cited by examiner

*Primary Examiner* — Mike M Dollinger

(57) ABSTRACT

This invention relates to a copolymer composition comprising vinyl ester of 2-ethyl hexanoic acid (VEHA), and particularly to pressure-sensitive adhesive compositions based on VEHA reacted with (meth)acrylate monomers. The present adhesive compositions provide a film with high cohesion and adhesion values, and more particularly to pressure-sensitive adhesive compositions based on VEHA reacted with (meth)acrylate monomers and VeoVa 10. The present adhesive compositions provide a film with high cohesion and adhesion values with Peel on Teflon of at least 2 N/inch.

11 Claims, No Drawings

PRESSURE SENSITIVE ADHESIVE COPOLYMER COMPOSITIONS

This invention relates to a copolymer composition comprising vinyl ester of 2-ethyl hexanoic acid (VEHA), and more particularly to pressure-sensitive adhesive compositions based on VEHA reacted with optionally (meth)acrylic acid monomers and/or optionally vinyl acetate, and other copolymerisable vinyl monomers.

According to definition of the industry the pressure sensitive adhesive (PSA) is a material which is aggressively and permanently tacky, adheres to the substrate with a slight pressure (such as with the finger) and that can be removed from the substrate without leaving a residue.

Commonly used copolymers are pure acrylic resins and generally have a low glass transition temperature (Tg); such a copolymer could be made via an emulsion polymerization.

PSA can achieve adequate adhesion or adequate cohesion, several investigation have tried to optimize this balance between both properties and it is nearly impossible to achieve this, trying to optimize one property will reduce the other. Therefore it is desirable to have an adhesive composition that can provide adhesion and tack while maintaining cohesion at high level.

It has been discovered that the use of vinyl ester of 2-ethyl hexanoic acid (VEHA) in PSA copolymer formulations leads to this good combination of tack and cohesion, and more particularly to pressure-sensitive adhesive compositions based on VEHA reacted with optionally (meth)acrylic acid monomers and/or optionally vinyl acetate, and other copolymerisable vinyl monomers. More particularly a pressure-sensitive adhesive copolymer compositions comprising a reaction product of VEHA reacted with (meth)acrylic acid monomers, optionally vinyl acetate, and optionally a vinyl ester of alkyl in 2 to 17 carbon atoms acids, and further a particular pressure-sensitive adhesive compositions based on VEHA reacted with (meth)acrylate monomers and/or vinyl acetate, and other copolymerisable monomers. More particularly a pressure-sensitive adhesive copolymer compositions comprising a reaction product of VEHA and/or an (meth)acrylate, vinyl acetate, optionally (meth)acrylic acid and optionally a vinyl ester of alkyl in 2 to 17 carbon atoms acids.

Copolymer compositions of this invention are based on a copolymer comprises 20-85 weight % of VEHA and 15-80 wt % of an (meth)acrylate and optionally (meth)acrylic acid and optionally a vinyl ester of alkyl in 2 to 17 carbon atoms acids.

A further copolymer compositions of this invention are also based on a copolymer comprises 60-85 weight % VEHA and 15-40 wt % of vinyl acetate and optionally (meth)acrylic acid and optionally a vinyl ester of alkyl in 2 to 17 carbon atoms acids.

Another copolymer compositions of this invention are based on a copolymer comprises 60-95 weight % of VEHA and 1-5 wt % (meth)acrylic acid monomers, and 5-35 weight % of a vinyl ester of alkyl in 2 to 17 carbon atoms acids, optionally vinyl acetate.

The acrylate monomers are including the acrylate and the methacrylate ester commonly use in the field, such as for example: The (meth)acrylates are reaction products of ethylenically unsaturated carboxylic acids and C1 to C20 alcohols. Examples of (meth)acrylates include, but are not limited to, methyl(meth)acrylate, ethyl(meth)acrylate, propyl(meth)acrylate, n-butyl(meth)acrylate, isobutyl(meth)acrylate, t-butyl(meth)acrylate, pentyl(meth)acrylate, hexyl(meth)acrylate, cyclohexyl(meth)acrylate, benzyl(meth)acrylate, 2-ethylhexyl(meth)acrylate, heptyl(meth)acrylate, n-octyl(meth)acrylate, iso-octyl(meth)acrylate, nonyl(meth)acrylate, decyl(meth)acrylate, 2-propyl heptyl(meth)acrylate, undecyl(meth)acrylate, dodecyl(meth)acrylate, tridecyl (meth)acrylate, lauryl(meth)acrylate, stearyl(meth)acrylate, isobornyl(meth)acrylate, norbornyl(meth)acrylate, 4-tertbutylcyclohexyl(meth)acrylate, 3,3,5-trimethylcyclohexyl (meth)acrylate, dimethyl maleate, n-butyl maleate, alkylene glycol di(meth)acrylates, ethylene glycol di(meth)acrylate, 1,3-butylene glycol di(meth)acrylate, 1,4-butylene glycol di(meth)acrylate, propylene glycol(meth)acrylate, 1,6-hexanediol di(meth)acrylate, dipropylene glycol di(meth) acrylate, tripropylene glycol di(meth)acrylate, trimethylolpropane tri(meth)acrylate, cyclopentadienyl(meth)acrylate, carbodiimide(meth)acrylate, t-butylaminoethyl(meth)acrylate, 2-t-butylaminoethyl(meth)acrylate, and N,N-dimethylaminoethyl(meth)acrylate.

Acrylic acid includes also methacrylic acid which will be used in the same range of concentration as acrylic acid, beta-carboxy ethyl acrylate and itaconic acid.

Examples of vinyl esters of C3 to C18 carboxylic acids include, but are not limited to, vinyl propionate, vinyl n-butyrate, vinyl laurate, vinyl caprate (n-decanoate), and vinyl stereate (n-octadecanoate). Also included are branched vinyl esters, such as Versatic acids (available from Momentive Specialty Chemicals Inc.), or vinyl neodecanoates such as VeoVa 9 or VeoVa 10 (also available from Momentive Specialty Chemicals Inc. hereinafter "Momentive") and vinyl pivalate.

In an embodiment the pressure-sensitive copolymer comprises 20-85 weight % of vinyl ester of 2-ethyl hexanoic acid(VEHA) and 15-80 wt % of an (meth)acrylate and 0-5 wt % of (meth)acrylic acid and 0-25 wt % of a vinyl ester of alkyl in 2 to 17 carbon atoms acids.

In another embodiment the pressure-sensitive copolymer comprises 60-85 weight % VEHA and 15-40 wt % of vinyl acetate 0-5 wt % of (meth)acrylic acid and 0-25 wt % of a vinyl ester of alkyl in 2 to 17 carbon atoms acids, and preferably 1-5 wt % of (meth)acrylic acid and most preferably 2-3 wt %, and functional monomers well used by persons skilled in the art as for examples silane derivatives such Silquest A-174 NT which is added shortly before the end of the emulsion polymerization.

Preferably the above given copolymers have a glass transition temperature (Tg) lower as −5° C. The copolymer composition comprising 20-85 weight % of VEHA and 15-80 wt % of an acrylate and optionally acrylic acid and optionally a vinyl ester of alkyl in 2 to 17 carbon atoms acids, has a glass transition temperature (Tg) lower as −15° C. and preferably lower as −20° C. and most preferably lower as −25° C., but not lower as −80° C. The copolymer composition comprising 60-85 weight % VEHA and 15-40 wt % of vinyl acetate and optionally (meth)acrylic acid and optionally a vinyl ester of alkyl in 6 to 18 carbon atoms acids, has a (Tg) lower as −10° C. and preferably lower as −15° C. and most preferably lower as −20° C., but not lower as −80° C. The glass transition temperature here is the onset temperature in accordance with ASTM D 3418-82, determined by means of differential scanning calorimetry (DSC).

In a further other embodiment the pressure-sensitive copolymer comprises 40-85 weight % VEHA and 15-40 wt % of vinyl acetate 0-5 wt % of (meth)acrylic acid and 0-40 wt % of a vinyl ester of alkyl in 2 to 17 carbon atoms acids, and preferably 1-5 wt % of (meth)acrylic acid and most preferably 2-3 wt %, and functional monomers well used by persons skilled in the art as for examples silane derivatives such Silquest A-174 NT or Silquest 151 which are added shortly before the end of the emulsion polymerization, such a silane can be used in a range from 0.05-0.5 weight %, preferably 0.075-0.3 weight %, more preferably from 0.1-0.2 weigh %.

In another embodiment the pressure-sensitive copolymer comprises 70-95 weight % of vinyl ester of 2-ethyl hexanoic acid (VEHA) and 1-2 wt % (meth)acrylic acid monomers, 5-28 wt % of a vinyl ester of alkyl in 2 to 17 carbon atoms acids.

In another further embodiment the pressure-sensitive copolymer comprises 75-89 weight % VEHA, 1-1.5 wt % of (meth)acrylic acid and 10-23.5 wt % of a vinyl ester of alkyl in 2 to 17 carbon atoms acids, and functional monomers well used by persons skilled in the art as for examples silane derivatives such Silquest A-174 NT or Silquest 151 which are added shortly before the end of the emulsion polymerization, such a silane can be used in a range from 0.05-0.5 weight %, preferably 0.075-0.3 weight %, more preferably from 0.1-0.2 weigh %.

Preferably the above given copolymers have a glass transition temperature (Tg) lower as −32° C. The copolymer composition comprising 60-89 weight % of VEHA and 1-3 wt % (meth)acrylic acid monomers and 10-37 wt % of a vinyl ester of alkyl in 2 to 17 carbon atoms acids, has a glass transition temperature (Tg) lower as −20° C. and preferably lower as −25° C. and most preferably lower as −30° C., but not lower as −80° C. The glass transition temperature here is the onset temperature in accordance with ASTM D 3418-82, determined by means of differential scanning calorimetry (DSC).

The polymers of the present invention and forming the basis of the pressure sensitive adhesive are aqueous polymer dispersions, also called latex. They are prepared preferably by means of free-radically initiated aqueous emulsion polymerization, in which the monomers are emulsified in water with a surface active agent and/or stabilized by a protective colloid and reacted using emulsion polymerization techniques known in the art. The use of a booster (such as Bruggolite® FF6M; manufactured by Brüggemann Chemical) at the end of the polymerization reaction, which will reduce the level of residual monomers is a efficient way to achieve and adhesive with high cohesion values and adhesion.

The surface active agent could be as usual an anionic surfactant such as Dowfax 2A1 at a level of about 1 wt %, and/or a non-ionic surfactant such as the Disponil A 3065 or Disponil OC 25 at a level of 1.5 to 2.5 wt %; the non-ionic surfactant with unsaturations such as Reasoap ER-30 has showed an adhesive layer with improved cohesion over a saturated surfactant.

The polymerization medium can comprise either just water or mixtures of water and water-miscible liquids such as methanol. Preferably, only water is used. It is possible to include the totality of the liquid medium in the initial charge to the polymerization vessel. An alternative option is to include none, or only a portion, of the liquid medium in the initial charge and to add it all, or the remaining portion, continuously or discontinuously, in the course of the polymerization.

The polymers can be applied to any substrate, such as rigid or flexible polyolefins, fluorinated polyolefins, packaging films, glass, corrugated containers, and metals, as a pressure-sensitive adhesive for label and tape applications. The resulting adhesive film can be used as a free film or in conjunction with a carrier material or facestock. Common facestocks include, but are not limited to, papers and films. With tapes, the polymer can be applied to one or both sides of the tape. Typically, the polymer is applied as an aqueous dispersion or emulsion. After the dispersion is applied, the water is removed by ambient drying or by heated drying.

EXAMPLES

Polymerization Procedure

Resin A

A reactor charge containing 250.01 g of deionized water and 0.76 g of potassium persulfate (manufactured by Sigma Aldrich) is formed. A pre-emulsion is formed by dissolving 2.02 g of sodium carbonate (manufactured by Sigma Aldrich), 23.67 g of Disponil A3065 (100% solids, manufactured by Cognis), 33.26 g of Dowfax 2A1 (45% solids, manufactured by Dow) in 395.00 g of deionized water.

A monomer mix is made up with 0.31 g of n-dodecanethiol (manufactured by Sigma Aldrich), 460.11 g of 2-ethylhexyl acrylate (manufactured by Sigma Aldrich), 200.18 g of vinyl 2-ethylhexanoate (manufactured by Momentive), 150.02 g of ethyl acrylate (manufactured by Sigma Aldrich), 150.07 g of methyl acrylate (manufactured by Sigma Aldrich), 10.72 g of acrylic acid (manufactured by Sigma Aldrich), 30.20 g of methylmethacrylate (manufactured by Sigma Aldrich), 10.00 g of Nourycryl MA 123-M50 (50% solution in methyl methacrylate, manufactured by Akzo). The monomer mix is added to the pre-emulsion solution and is stirred.

An aqueous initiator solution is prepared by dissolving 2.27 g of potassium persulfate in 120.13 g of deionized water.

The reactor charge is introduced to a 3-liter reactor. The reactor charged is heated to 60° C. under nitrogen stream. When the temperature of 60° C. is reached, the nitrogen steam is stopped and 2.5% weight of the monomer pre-emulsion is added at once. The reactor is heated to 85° C. and when the temperature is reached, the pre-emulsion is added over 3 hours at the rate of 8.142 g/min. In parallel, the aqueous initiator solution is added over 3.25 hours at the rate of 0.627 g/min. Throughout the feeds, the internal temperature of the reactor is maintained at 85° C. After the feeds are complete, the contents are held at 85° C. for an additional hour and then cooled to 60° C. A booster shot, made up with 0.13 g of Bruggolite® FF6M (manufactured by Brüggemann Chemical) in 5.03 g of deionized water. Five minutes after this shot, a parallel addition of reducing agent solution made up with 0.51 g of Bruggolite®FF6M in 20.07 g of deionized water and a oxidizing agent solution made up with 0.71 g of tert-butylhydroperoxyde (70% solution in water, manufactured by Sigma Aldrich) in 20.31 g of deionized water is performed. This step is followed by a 30 minutes post cook at 60° C. Finally, the latex is cooled down to room temperature, 4.00 g of biocide Acticide MBS (2.5% solution in water, manufactured by Thor) is added. The final latex solids are 54.9%. Viscosity is 327 cps (Brookfield, spindle 2 at 50 rpm). Particle size measurements yielded a monomodal distribution, 189 nm.

Resin B

A reactor charge containing 357.42 g of deionized water, 1.50 g of Rhodacal DS10 (100% solid, manufactured by Rhodia), 2.00 g of sodium bicarbonate (manufactured by Sigma Aldrich) and 0.99 g of potassium persulfate (manufactured by Sigma Aldrich) is formed. A pre-emulsion is formed by dissolving 2.01 g of sodium bicarbonate (manufactured by Sigma Aldrich), 1.49 g of Rhodacal DS10

(100% solids, manufactured by Rhodia), 31.24 g of Disponil A3065 (65% solids, manufactured by Cognis) in 389.22 g of deionized water.

A monomer mix is made up with 750.03 g of vinyl 2-ethylhexanoate (manufactured by Momentive), 218.50 g of vinyl acetate (manufactured by Sigma Aldrich), and 30.00 g of acrylic acid (manufactured by Sigma Aldrich). The monomer mix is added to the pre-emulsion solution and is stirred.

An aqueous initiator solution is prepared by dissolving 2.32 g of potassium persulfate in 120.01 g of deionized water.

The reactor charge is introduced to a 3-liter reactor. 5.00 g of Cellosize QP300 (manufactured by Dow) are added in the reactor under stirring via a powder funnel to the reactor charge. The reactor charged is heated to 60° C. under nitrogen stream. When the temperature of 60° C. is reached, the nitrogen steam is stopped and 2.5% weight of the monomer pre-emulsion is added at once. The reactor is heated to 80° C. and when the temperature is reached, the pre-emulsion is added over 3 hours at the rate of 7.911 g/min. In parallel, the aqueous initiator solution is added over 3.25 hours at the rate of 0.627 g/min. Throughout the feeds, the internal temperature of the reactor is maintained at 80° C. 30 minutes before the end of the pre-emulsion addition, 1.50 g of Silquest A-174 NT (manufactured by Momentive) are added to the pre-emulsion. After the feeds are complete, the contents are held at 80° C. for two additional hours and then cooled down to room temperature. The final latex solids are 53.2%. Viscosity is 351 cps (Brookfield, spindle 2/50 rpm). Particle size measurements yielded a monomodal distribution, 351 nm.

Resins C and D are Prepared as Resin B with the Monomer Composition as Given in Table 1 Below Resin E A reactor is charged with 240.01 g of deionized water, 0.65 g of potassium persulfate (manufactured by Sigma Aldrich), 1.75 g of sodium carbonate (manufactured by Sigma Aldrich), 2.62 g of anionic surfactant Rhodacal DS10 (manufactured by Rhodia) (or Dowfax 2A1, 45% solids, manufactured by Dow) and 4.37 g of hydroxyethyl cellulose Cellosize QP 300 (manufactured by Dow). A pre-emulsion is formed by dissolving 20.96 g of non-ionic surfactant with EO from 10 to 30 (Disponil A3065, 100% solids, EO 30 or Disponil AFX 1080, 79% solids, EO 10, manufactured by Cognis), 2.62 g of Rhodacal DS10 or Dowfax 2A1 in 371.14 g of deionized water.

A monomer mix is made up with 582.91 g of vinyl 2-ethylhexanoate (manufactured by Momentive), 6.55 g of acrylic acid (manufactured by Sigma Aldrich), and 65.5 g of VeoVa 10 (manufactured by Momentive). The monomer mix is added to the pre-emulsion solution and is stirred.

An aqueous initiator solution is prepared by dissolving 2.62 g of potassium persulfate in 87.33 g of deionized water.

The reactor charge is introduced to a 3-liter reactor. The reactor charged is heated to 60° C. under nitrogen stream. When the temperature of 60° C. is reached, the nitrogen steam is stopped and 2.5% weight of the monomer pre-emulsion is added at once. The reactor is heated to 85° C. and when the temperature is reached, the pre-emulsion is added over 3 hours at the rate of 8.142 g/min. In parallel, the aqueous initiator solution is added over 3.25 hours at the rate of 0.627 g/min. Throughout the feeds, the internal temperature of the reactor is maintained at 85° C. After the feeds are complete, the contents are held at 85° C. for an additional hour and then cooled to 60° C. A booster shot, made up with 0.13 g of Bruggolite® FF6M (manufactured by Brüggemann Chemical) in 5.03 g of deionized water. Five minutes after this shot, a parallel addition of reducing agent solution made up with 0.51 g of Bruggolite®FF6M in 20.07 g of deionized water and a oxidizing agent solution made up with 0.71 g of tert-butylhydroperoxide (70% solution in water, manufactured by Sigma Aldrich) in 20.31 g of deionized water is performed. This step is followed by a 30 minutes post cook at 60° C. Finally, the latex is cooled down to room temperature, 4.00 g of biocide Acticide MBS (2.5% solution in water, manufactured by Thor) is added. The final latex solids are 54.9%. Viscosity is 327 cps (Brookfield, spindle 2 at 50 rpm). Particle size measurements yielded a monomodal distribution, 189 nm.

TABLE 1 copolymer compositions

| Monomer | A | B | C | D | E | Comparative 1 | Comparative 2 |
|---------|---|---|---|---|---|---------------|---------------|
| VEHA | 200 | 750 | 700 | 500 | 890 | — | — |
| VA | — | 218 | — | 220 | — | — | — |
| 2EHA | 460 | — | — | — | — | — | 600 |
| EA | 150 | — | 125 | — | — | 125 | 150 |
| MA | 150 | — | 125 | — | — | 125 | 200 |
| AA | 10 | 30 | 10 | 30 | 10 | 10 | 10 |
| MMA | 30 | — | 30 | — | — | 30 | 30 |
| VV10 | — | — | — | — | 100 | — | — |
| VL | — | — | — | 250 | — | 700 | — |

VEHA: vinyl of ethyl hexanoic acid,
VA: vinyl acetate,
2EHA: 2-ethyl hexyl acrylate,
EA: ethyl acrylate,
MA: methyl acrylate,
AA: acrylic acid,
MMA: methyl methacrylate,
VV10: VeoVa 10,
VL: vinyl laurate.

TABLE 2 copolymer Tg

| Compostion | A | B | C | D | E | Comparative 1 | Comparative 2 |
|------------|---|---|---|---|---|---------------|---------------|
| Tg ° C. calulated | −38 | −24 | −28 | −33 | −32 | −56 | −38 |
| Tg ° C. measured | −38 | −17 | −21 | — | — | −31 | −41 |

Calculated Tg according the Fox equation; Measured Tg according the method set above by DSC.

Test Methods:

DSC method: Tg was determined by using the apparatus TA Instruments Thermal Analysis DSC Standard Cell FC. Sample was heated in aluminum pan at a rate of 10° C./min under nitrogen atmosphere (50 ml/min flow) in temperature range of −90 to 100° C. Measurement was done in two heating/cooling cycles.

Adhesion-180° Peel test according to the FTM-1 method was done on samples after 24 h storage at 25° C., RH:50%; the substrate is stainless steel (SS), glass or high density polyethylene (HDPE) and on Teflon.

Loop-Tack test according to the FTM-9 method was done on a sample of 1×1×25 mm on SS after 24 h storage at 25° C.

Cohesion-static shear test according to FTM-8 method was done on a sample of 1×0.5 25 mm-1 kg on SS after 24 h storage at 25° C.

The adhesive compositions of this invention containing the vinyl ester of 2-ethyl hexanoic acid lead to high cohesion values with high adhesion values as tested on steel. The use of vinyl laurate provide also high cohesion but lower adhesion values. The adhesive based on acrylate monomer only leads to lower cohesion values but keeping good adhesion.

The adhesive compositions of this invention containing the vinyl ester of 2-ethyl hexanoic acid lead to high cohesion values with high adhesion values as tested on steel. The use of vinyl laurate provide also high cohesion but lower adhesion values. The adhesive based on acrylate monomer only leads to lower cohesion values but keeping good adhesion.

TABLE 3 properties of the applied adhesives

| Test | A | B | C | D | E | Comparative 1 | Comparative 2 |
|---|---|---|---|---|---|---|---|
| Adhesion SS N/25 mm | 8.3 | 9.6 | 9.3 | 8.5 | 7.5 | 4.8 | 7.9 |
| PE N/25 mm | 4.0 | 4.2 | 4.6 | 6.1 | 10.1 | 2.5 | 4.1 |
| Glass N/25 mm | 7.5 | 9.1 | 8.6 | 6.7 | 9.5 | 3.6 | 7.2 |
| Teflon N/25 mm | — | — | — | — | 5.5 | 0.5 | 0.5 |
| Tack N/25 mm | 5.1 | 3.4 | 5.8 | 4.4 | — | 2.5 | 4.2 |
| Cohesion minutes | 10000 | >10000 | >10000 | 3400 | — | >10000 | 1653 |

The adhesive compositions of this invention Resin E containing the vinyl ester of 2-ethyl hexanoic acid and VeoVa 10 lead to high cohesion values with high adhesion values as tested on steel. The use of VeoVa 10 provide also an improve value of the peel test on Teflon (5.5), whereas the comparative examples without VeoVa 10 the value was around 0.5.

For the example of resin D when the surfactant Disponil is replaced by the Reasoap ER30 the cohesion value measured is 10000 minutes.

The preparation of the resin D was also adjusted to reduce the residual monomers below 100 ppm. The following modification has been applied: 1 hour after the termination of the monomer addition step; a booster is added (level see as example resin A) and after 90 minutes the level of each monomer drops below 100 ppm. The adhesive based on this resin lead to a cohesion of more than 10000 minutes, the adhesion on PE raised to 7.6 N/25 mm and keeping the other properties similar to the initial values of resin D.

The UV exposure (one week UV-A) of the adhesive layer on formulation based on resin B and expressed in % of retention adhesion left was more than two time higher as a benchmark or a acrylic containing 70 wt % of 2-EHA.

The invention claimed is:

1. A pressure-sensitive adhesive copolymer composition comprising a reaction product consisting of:
   60 to 85 weight % of vinyl ester of 2-ethyl hexanoic acid, and
   one or more compounds selected from the group consisting of vinyl acetate, (meth)acrylate, (meth)acrylic acid, a vinyl ester of C3 to C18 carboxylic acid, and combinations thereof, wherein the total weight % of the copolymer is 100 weight % and wherein, when applied, comprises an adhesive layer having at least:
   a. a 180° peel of from 7.5 N/25 mm to 10 N/25 mm, as measured by FTM-1 on stainless steel at room temperature after 24 hours;
   b. a 180° peel of from 3.5 N/25 mm to 6 N/25 mm, as measured by FTM-1 on polyethylene at room temperature after 24 hours;
   c. a 180° peel of from 7.5 N/25 mm to 12 N/25 mm, as measured by FTM-1 on glass at room temperature after 24 hours;
   d. a shear holding of more than 5000 minutes, as measured by FTM-8 on stainless steel at room temperature after 24 hours; or
   e. a loop-tack test of from 3 N to 10 N, as measured by FTM-9 on stainless steel at room temperature after 24 hours
   or wherein, when applied, rises an adhesive layer having at least:
   a. a 180° peel of from 7.5 N/25 mm to 15 N/25 mm, as measured by FTM-1 on stainless steel at room temperature after 24 hours;
   b. a 180° peel of from 3.5 N/25 mm to 15 N/25 mm, as measured by FTM-1 on polyethylene at room temperature after 24 hours;
   c. a 180° peel of from 7.5 N/25 mm to 15 N/25 mm, as measured by FTM-1 on glass at room temperature after 24 hours;
   d. a shear holding of more than 500 minutes, as measured by FTM-8, on stainless steel at room temperature after 24 hours;
   e. a loop-tack test of from 3 N to 10 N, as measured by FTM-9 on stainless steel at room temperature after 24 hours; or
   f. a 180° peel of from 2N/25 mm to 7.5N/25 mm, as measured by FTM-1 on Teflon at room temperature after 24 hours.

2. The copolymer composition of claim 1 wherein the (meth)acrylate comprises the reaction products of ethylenically unsaturated carboxylic acids and C1 to C20 alcohols.

3. The copolymer composition of claim 2 wherein the (meth)acrylate is selected from the group of methyl(meth)acrylate, ethyl(meth)acrylate, propyl(meth)acrylate, n-butyl (meth)acrylate, isobutyl(meth)acrylate, t-butyl(meth)acrylate, pentyl(meth)acrylate, hexyl(meth)acrylate, cyclohexyl (meth)acrylate, benzyl(meth)acrylate, 2-ethylhexyl(meth) acrylate, heptyl(meth)acrylate, n-octyl(meth)acrylate, iso-octyl(meth)acrylate, nonyl(meth)acrylate, decyl(meth) acrylate, 2-propyl heptyl(meth)acrylate, undecyl(meth) acrylate, dodecyl(meth)acrylate, tridecyl(meth)acrylate, lauryl(meth)acrylate, stearyl(meth)acrylate, isobornyl(meth) acrylate, norbornyl(meth)acrylate, 4-tertbutylcyclohexyl (meth)acrylate, 3,3,5-trimethylcyclohexyl(meth)acrylate, dimethyl maleate, n-butyl maleate, alkylene glycol di(meth) acrylates, ethylene glycol di(meth)acrylate, 1,3-butylene glycol di(meth)acrylate, 1,4-butylene glycol di(meth)acrylate, propylene glycol(meth)acrylate, 1,6-hexanediol di(meth)acrylate, dipropylene glycol di(meth)acrylate, tripropylene glycol di(meth)acrylate, trimethylolpropane tri(meth) acrylate, cyclopentadienyl(meth)acrylate, carbodiimide (meth)acrylate, t-butylaminoethyl(meth)acrylate, 2-t-butylaminoethyl(meth)acrylate, and N,N-dimethylaminoethyl(meth)acrylate.

4. The copolymer composition of claim 1 made by an emulsion polymerization route.

5. The copolymer composition of claim 4, wherein the reaction product has a residual level of each monomer of below 100 ppm.

6. A pressure-sensitive adhesive composition comprising:
the copolymer composition comprising a reaction product consisting of:
   60 to 85 weight % of vinyl ester of 2-ethyl hexanoic acid, and
   one or more compounds selected from the group consisting of vinyl acetate, (meth)acrylate, (meth)acrylic acid, a vinyl ester of C3 to C18 carboxylic acid, and combinations thereof, and
one or more of silane derivatives, a tackifier, an antifoam, a plasticizer, a surfactant, a wetting agent, a protective colloid, filler, a thickening agent, an antiseptic, a biocide, a dispersing agent, a pH adjusting agent, a corrosion inhibitor, an ultraviolet light stabilizer, a crosslinking promoter, an antioxidant, and another polymer, wherein, when applied, comprises an adhesive layer having at least:
a. a 180° peel of from 7.5 N/25 mm to 10 N/25 mm, as measured by FTM-1 on stainless steel at room temperature after 24 hours;
b. a 180° peel of from 3.5 N/25 mm to 6 N/25 mm, as measured by FTM-1 on polyethylene at room temperature after 24 hours;
c. a 180° peel of from 7.5 N/25 mm to 12 N/25 mm, as measured by FTM-1 on glass at room temperature after 24 hours;
d. a shear holding of more than 5000 minutes, as measured by FTM-8 on stainless steel at room temperature after 24 hours; or
e. a loop-tack test of from 3 N to 10 N, as measured by FTM-9 on stainless steel at room temperature after 24 hours,
or wherein, when applied, comprises an adhesive layer having at least:
a. a 180° peel of from 7.5 N/25 mm to 15 N/25 mm, as measured by FTM-1 on stainless steel at room temperature after 24 hours;
b. a 180° peel of from 3.5 N/25 mm to 15 N/25 mm, as measured by FTM-1 on polyethylene at room temperature after 24 hours;
c. a 180° peel of from 7.5 N/25 mm to 15 N/25 mm, as measured by FTM-1 on glass at room temperature after 24 hours;
d. a shear holding of more than 500 minutes, as measured by FTM-8, on stainless steel at room temperature after 24 hours;
e. a loop-tack test of from 3 N to 10 N, as measured by FTM-9 on stainless steel at room temperature after 24 hours; or
f. a 180° peel of from 2 N/25 mm to 7.5 N/25 mm, as measured by FTM-1 on Teflon at room temperature after 24 hours.

7. A pressure-sensitive adhesive composition of claim 6, wherein the copolymer has a glass transition temperature (Tg) lower than −25° C.

8. A pressure-sensitive adhesive composition of claim 6, wherein the copolymer has a glass transition temperature (Tg) in a range of from −5° C. to −80° C.

9. The copolymer composition of claim 1 wherein the copolymer has a glass transition temperature (Tg) lower than −5° C.

10. The copolymer composition of claim 1 wherein the copolymer has a glass transition temperature (Tg) in a range of from −5° C. to −80° C.

11. The pressure-sensitive adhesive composition of claim 6, wherein the copolymer composition has a glass transition temperature (Tg) in a range of from −5° C. to −80° C.

* * * * *